United States Patent
Traba et al.

(10) Patent No.: US 11,553,090 B2
(45) Date of Patent: *Jan. 10, 2023

(54) DYNAMIC METRIC OPTIMIZATION IN PREDICTIVE BEHAVIORAL ROUTING

(71) Applicant: NICE LTD., Ra'anana (IL)

(72) Inventors: Andrew Michael Traba, Chicago, IL (US); Luke Daniel Olson, Chicago, IL (US)

(73) Assignee: NICE LTD., Ra'anana (IL)

( * ) Notice: Subject to any disclaimer, the term of this patent is extended or adjusted under 35 U.S.C. 154(b) by 20 days.

This patent is subject to a terminal disclaimer.

(21) Appl. No.: 17/381,933

(22) Filed: Jul. 21, 2021

(65) Prior Publication Data
US 2021/0377392 A1     Dec. 2, 2021

Related U.S. Application Data

(63) Continuation of application No. 16/886,204, filed on May 28, 2020, now Pat. No. 11,089,162.

(51) Int. Cl.
*H04M 3/523* (2006.01)
*G06Q 10/06* (2012.01)
*H04M 3/51* (2006.01)

(52) U.S. Cl.
CPC .... *H04M 3/5235* (2013.01); *G06Q 10/06398* (2013.01); *H04M 3/5175* (2013.01); *H04M 2203/408* (2013.01)

(58) Field of Classification Search
None
See application file for complete search history.

(56) References Cited

U.S. PATENT DOCUMENTS

| | | | |
|---|---|---|---|
| 8,718,262 B2 | 5/2014 | Conway et al. |
| 8,867,733 B1 | 10/2014 | Conway et al. |
| 8,891,754 B2 | 11/2014 | Conway et al. |
| 8,983,054 B2 | 3/2015 | Conway et al. |
| 9,083,804 B2 | 7/2015 | Conway et al. |
| 9,106,748 B2 | 8/2015 | Conway et al. |
| 9,124,701 B2 | 9/2015 | Conway et al. |
| 9,137,372 B2 | 9/2015 | Conway et al. |

(Continued)

OTHER PUBLICATIONS

U.S. Appl. No. 16/886,204, Traba, et al., filed May 28, 2020.

*Primary Examiner* — Nafiz E Hoque
(74) *Attorney, Agent, or Firm* — Haynes and Boone, LLP

(57) ABSTRACT

Methods for optimizing the routing of customer communications include receiving a customer communication; identifying a customer associated with the customer communication; accessing a profile of the identified customer to determine customer data; receiving customer metric scores for a plurality of customer metrics; identifying available agents; accessing a profile of each available agent to determine agent data; predicting interaction outcome metric values for a plurality of customer metrics based on the customer data and the agent data; calculating, in real-time, an aggregate agent-customer pairing score for each available agent; selecting a responding agent from the available agents with the highest aggregate agent-customer pairing score; and providing a routing recommendation to a communication distributor to route the customer communication to the responding agent with the highest aggregate agent-customer pairing score.

20 Claims, 5 Drawing Sheets

(56) References Cited

U.S. PATENT DOCUMENTS

| | | |
|---|---|---|
| 9,137,373 B2 | 9/2015 | Conway et al. |
| 9,270,826 B2 | 2/2016 | Conway et al. |
| 9,398,157 B2 | 7/2016 | Conway et al. |
| 9,565,312 B2 | 2/2017 | Conway et al. |
| 9,667,795 B2 | 5/2017 | Conway et al. |
| 9,699,307 B2 | 7/2017 | Conway et al. |
| 9,848,085 B2 | 12/2017 | Conway et al. |
| 9,936,075 B2 | 4/2018 | Conway et al. |
| 10,718,031 B1 * | 7/2020 | Wu .................. G01N 33/57484 |
| 2009/0190747 A1 * | 7/2009 | Spottiswoode ..... H04M 3/5232 379/265.12 |
| 2015/0189088 A1 * | 7/2015 | Surridge ........ G06Q 10/063112 379/265.12 |

* cited by examiner

DYNAMIC METRIC OPTIMIZATION IN PREDICTIVE BEHAVIORAL ROUTING

CROSS-REFERENCE TO RELATED APPLICATION(S)

This application is a continuation of U.S. patent application Ser. No. 16/886,204, filed May 28, 2020, now allowed, the entire contents of which is hereby incorporated herein by express reference thereto.

TECHNICAL FIELD

The present disclosure relates to methods, apparatus, and systems for routing customer communications, and more particularly to determining how to optimize routing across different customer metrics based on employee, customer, and interaction information.

BACKGROUND

Call-routing ability and efficiency is important. The time it takes to connect a caller to a suitable agent affects customer satisfaction and hence business image. Mistakes in routing, connecting callers for example to overloaded centers or to agents not prepared to help with the customer's difficulty or desire, can be troublesome.

Automatic communication distribution (ACD) systems are known. Often an organization disseminates a single telephone number to its customers and to the public in general as a means of contacting the organization. As calls are directed to the organization from the public switch telephone network, the ACD system directs the calls to its agents based upon some type of criteria. For example, where all agents are considered equal, the ACD may distribute the calls based upon which agent has been idle the longest.

In addition, ACD systems generally require predefined and static distribution strategies that are unable to adapt in real-time. This limitation forces a "one size fits all" distribution approach optimized for a single customer metric, as opposed to a dynamic approach based on employee, customer, and interaction information. For example, an agent may be selected based on customer satisfaction where the available agents all perform similarly on customer satisfaction, but optimizing average handling time where the agents vary greatly is not analyzed. In another example, a customer is eligible for a new product offer so the customer could be routed to the agent most likely to upsell, rather than the global treatment based on customer satisfaction. In yet another example, a customer has contacted the contact center multiple times, but the company is optimizing all interactions for average handling time. This customer, however, would be better served by an agent with the highest resolution rate.

Accordingly, a need exists for improved methods and systems for routing customer communications.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
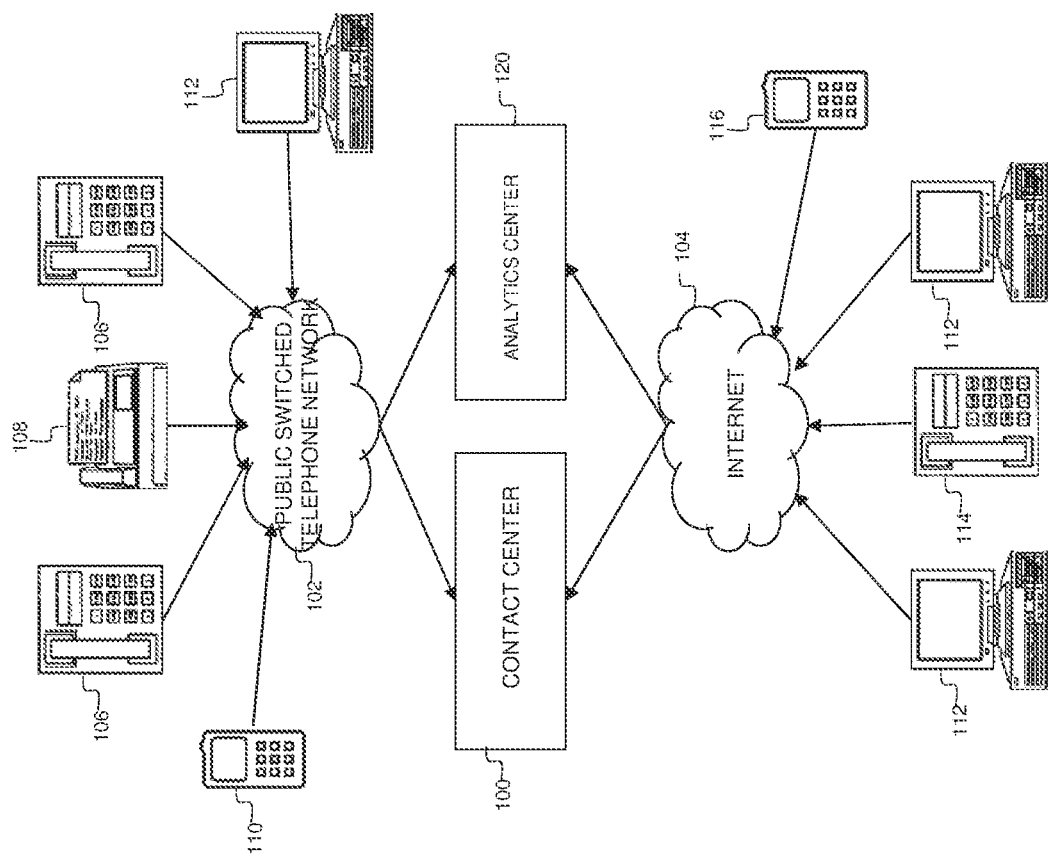
FIG. 1 is a simplified block diagram of an embodiment of a contact center according to various aspects of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The logic an ACD leverages to route a communication to an available agent is typically referred to as a distribution method. Generally, distribution methods are based on predefined logic that is focused on balancing an agent productivity metric. For example, a communication is usually routed to an available agent who is most idle. The distribution method, however, is constant for a given agent skill.

Innovative technologies, like predictive behavioral routing (PBR), leverage behavioral data to offer distribution methods focused on improving business outcomes. For example, a customer communication may be routed to the agent best suited for the customer in order to reduce average handle time, improve customer satisfaction, or increase sales rates. This customer optimization metric, however, is constant for the agent skill. Regardless of any information available about the customer or the available agents, every route for a customer communication is optimized based on a predetermined customer metric.

Currently, when a customer contacts a call center, after the ACD determines which customer metric should be optimized, the ACD sends PBR logic a transcript of a customer communication including a customer identifier. After the communication is received, PBR logic looks up the customer interaction history and unique customer attributes it has associated with the customer identifier. PBR logic also monitors which agents are currently logged in and available, and looks up the available agents' performance history. PBR logic then uses the agent and customer information to predict the outcome for a preconfigured customer metric used for all communications for that agent skill, and then recommends the agent with the most desirable predicted customer metric value.

Advantageously, the present disclosure uses dynamic metric optimization to leverage caller and agent information along with advanced analytics to determine, in real-time, the best customer metric(s) to optimize the routing of a customer to a suitable, available agent. Based on data available from interaction analytics (IA), customer journey analytics (CJA), PBR's behavioral database, workforce optimization (WFO), the ACD, client systems such as customer relationship management (CRM), and publicly available information, the optimization customer metric for the distribution method is determined in real time by artificial intelligence as described herein. For example, a specific customer communication may be routed to optimize average handle time (AHT), first call resolution (FCR), customer satisfaction (CSAT), revenue retention (RR), and/or sales. Dynamic metric optimization enables the ACD to have multi-metric improvement capabilities within a given agent skill.

For example, if a customer has an organizer personality type, no recent interactions, and a neutral emotional state, the routing may be optimized for AHT. If another customer has an advisor personality type, had three phone calls in the last 48 hours, and performed a recent website search for "appeal," the routing may be optimized for FCR. For a customer that has a connector personality type, is a VIP customer, and is unable to self-service, the routing may be optimized for CSAT. For a customer that has an original personality type, recent positive interactions, and is eligible for new product offers, routing may be optimized for upselling or sales. In all these examples, the routing may be optimized based on one or more (e.g., two, three, or four) customer metrics.

The present disclosure brings the routing strategy down to the interaction level, considering the specific customer interaction history, customer attributes, and situation. Using this data enables companies to have multi-metric improvement capabilities within a given agent skill.

In various embodiments, a single outcome customer metric is no longer used as the decision for agent-customer pairing. Instead, a function that takes predicted interaction outcome metric values across multiple customer metrics and caller preferences across multiple customer metrics as inputs is used, resulting in an optimization strategy not defined globally for the agent skill, but instead generated dynamically for each individual communication.

FIG. 1 is a simplified block diagram of an embodiment of a contact center 100 according to various aspects of the present disclosure. The term "contact center," as used herein, can include any facility or system server suitable for receiving and recording electronic communications from customers. Such customer communications can include, for example, telephone calls, facsimile transmissions, e-mails, web interactions, voice over IP ("VoIP") calls, and video calls. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of customer communications, particularly based on agent availability, prediction of profile (e.g., personality type) of the customer occurring in association with a customer interaction, matching of customer attributes to agent attributes, and/or matching of customer needs to current agent skills, be it a telephone-based interaction, a web-based interaction, or other type of electronic interaction over the PSTN 102 or Internet 104.

As one of ordinary skill in the art will recognize, based on the guidance herein, that the illustrated example of communication channels associated with a contact center 100 in FIG. 1 is just an example, and the contact center may accept customer interactions, other analyzed interaction information, and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
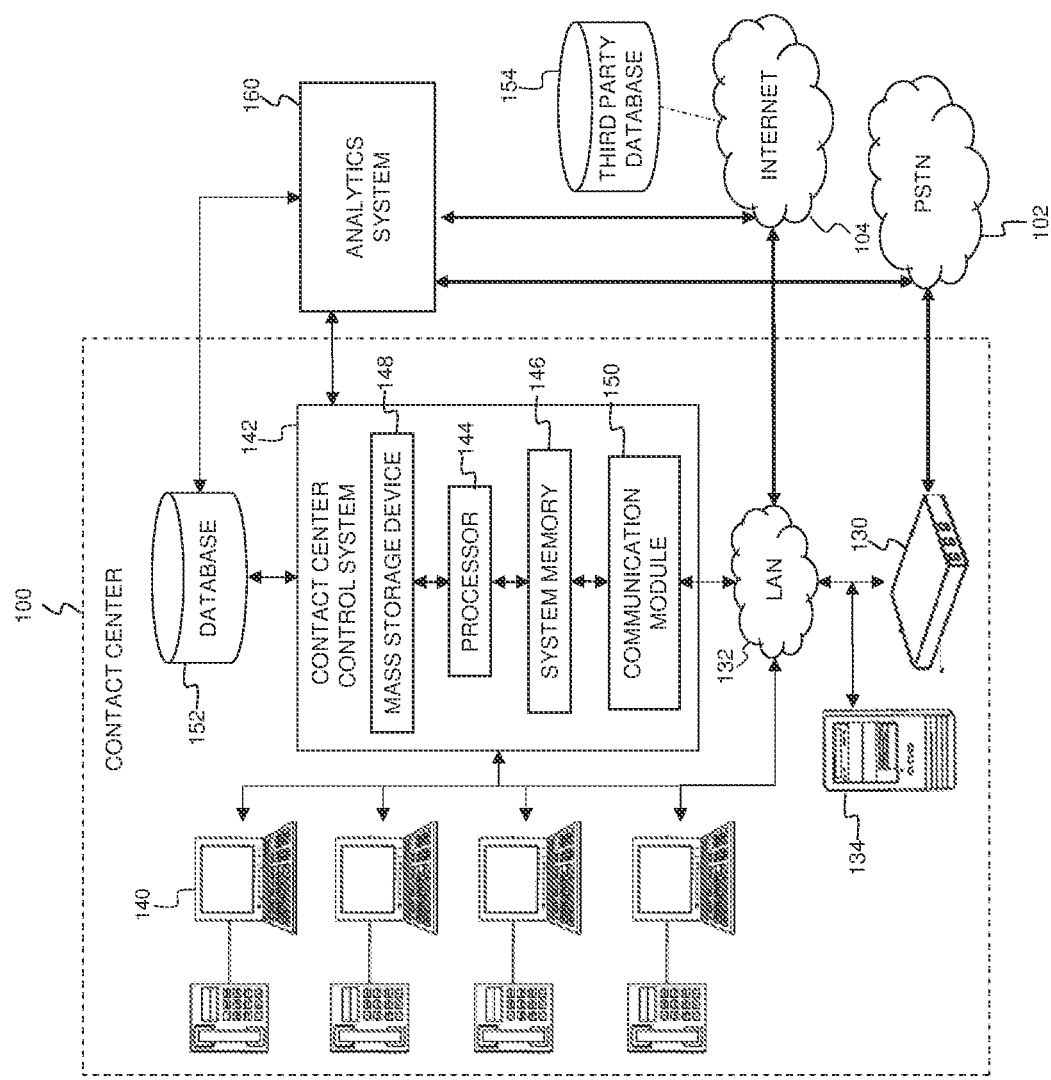
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

ACD 130 distributes customer communications or tasks to agents. Generally, ACD 130 is part of a switching system designed to receive customer communications and queue them. In addition, ACD 130 as shown distributes communications to agents or specific groups of agents typically according to a prearranged scheme. In one embodiment, ACD 130 is integrated with PBX switch 130, and directs customer communications to one of a plurality of agent workstations 140.

ACDs are specialized systems that are configured to match customer communications to an available contact center agent. ACDs generally receive incoming communications, determine where to route a particular customer communication, and connect the customer communication to an available agent. For the purposes of the present disclosure, "ACD" refers to any combination of hardware, software and/or embedded logic that is operable to automatically distribute incoming communications, including requests for service transmitted using any audio and/or video means, including signals, data or messages transmitted through voice devices, text chat, web sessions, facsimile, instant messaging and e-mail.

According to an exemplary embodiment, ACD 130 includes a processor, a network interface, and a memory module or database. The network interface joins ACD 130 with LAN 132. Once ACD 130 receives a customer communication, the processor determines which of a plurality of agents should receive the communication. For example, the processor may access the memory module, which stores code executed by the processor to perform various tasks.

In various embodiments, the processor includes a plurality of engines or modules. Examples of suitable engines include a distributor engine, a queue engine, and a monitor engine. The distributor engine distributes incoming customer communications to available agents, the queue engine monitors and maintains customer communications that are waiting to be connected to agents, and the monitor engine checks the status and skills of agents and stores appropriate information in the memory module.

The memory module stores various information about agents at the contact center, including, but not limited to, agent skills or attributes, agent location, and agent availability. Various alternative embodiments of ACD 130 may store different or additional information useful for communication routing as well. Over time, the monitor engine updates agent skills information, location information, and availability based on changes in agent status detected.

Generally, ACD 130 receives incoming communications that may be handled by one of the agents at the contact center. The distributor engine connects each communication to an appropriate available agent if the agent is available. If the agent is not available, the communication is generally held by the queue engine until the agent becomes available. Alternatively, a second agent who is presently available and who is almost as suitable could be selected and the ACD 130 could route the communication to that second agent. While a customer is waiting for an agent, ACD 130 may collect data from the customer or perform other automated processes. Once the agent is available, the distributor engine routes the communication to the agent.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art will recognize based on the guidance herein that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone (e.g., for telephonic or VoIP calls) and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, text (e.g., SMS, MMS), respond to website-based inquires, video chat with a customer, and otherwise participate in various customer interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, text analysis, predictive analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, texts (e.g., SMS, MMS, etc.), and instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular customer call from the time the call enters the contact center based on the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, customer "value" data (i.e., customer tenure, money spent as customer, etc.), personality type (as determined by past interactions), and other relevant customer identification. The control system 142 may also collect agent-specific unstructured and structured data including without limitation agent personality type, language skills, technical skills, performance data (e.g., customer retention rate, etc.), and tenure data, training level, average hold time during interactions, manager escalations, agent workstation utilization, and any other agent data relevant to contact center performance. Additionally, the types of data collected by the contact center control system 142 that are identified above are simply examples and additional and/or different interaction data, customer data, agent data, and telephony data may be collected and processed by the control system 142.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

The control system 142 may store recorded and collected interaction data in a database 152 (also referred to herein as behavior database 152), including customer data and agent data. In certain embodiments, agent data, such as agent scores for dealing with customers, are updated daily.

The behavior database 152 is, in one embodiment, a JavaScript Object Notation (JSON) structure. In various embodiments, the unique key is a customer identifier (e.g., automatic number identification (ANI) or member ID) and a company client identifier (e.g., Client A, Client B, Client C, etc.). These two elements uniquely define a record and are used to determine which feature set should be used in predictions for each interaction at a given company client. This is done because some features are applicable only to the company client they originated from, while many other features are applicable to all company clients such as a customer's communication preferences. Tied to each record is a set of features used in the prediction calculations described herein. This feature set is continually updated, the features can be any data type, and the features can be manipulated in various ways (e.g., normalized by the amount of total customer speech, squared, evaluated over various time periods such as the most recent week, etc.) resulting in a variety of permutations.

For example, the behavior database 152 may include cross-company client data derived from speech analytics such as:
Process Communication Model Personality style
  Organizer
  Advisor
  Connector
Communication patterns
  Pronoun usage
  Verb usage
Speech stats
  Speech rate (slow/fast)
  Lexical richness (simple/complicated)
  Pitch
  Tone
Emotional baseline
  Angry
  Happy
  Sad The behavior database 152 may also include company client-specific data derived from speech analytics, data analytics, and company client data integrations such as:
Normalized Customer Metric Scores
  Average Handle Time (AHT)
  Customer Satisfaction (CSAT)
  First Call Resolution (FCR)
  Revenue Retention (RR)
  Sales
Interaction sentiment history
  Positive
  Negative
  Trend
Interaction history derived from speech analytics
  Supervisor reference
  Competitor reference
  Life event reference (marriage, death, birth, etc.)
Frequency
  X calls in last Y time period
  X minutes in last time period
Interaction Outcomes
  Transfer
  Disconnect
Journey Data Points
  IVR entries
  Queue time
  Chat time
  Marketing touchpoints
  Website searches
Customer Relationship Management (CRM) data
  Lifetime value
  Status (silver, gold, platinum, etc.)
  Up/cross-sell eligibility In several embodiments, the behavioral database 152 looks up the features associated with a customer and passes them along to predictive calculator 143 for use in predicting interaction outcome metric values and as inputs in the aggregate agent-customer pairing score function.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third-party database 154. In certain embodiments, the control system 142 may query the third-party database for customer data such as credit reports, past transaction data, and other structured and unstructured data.

Figure 3:
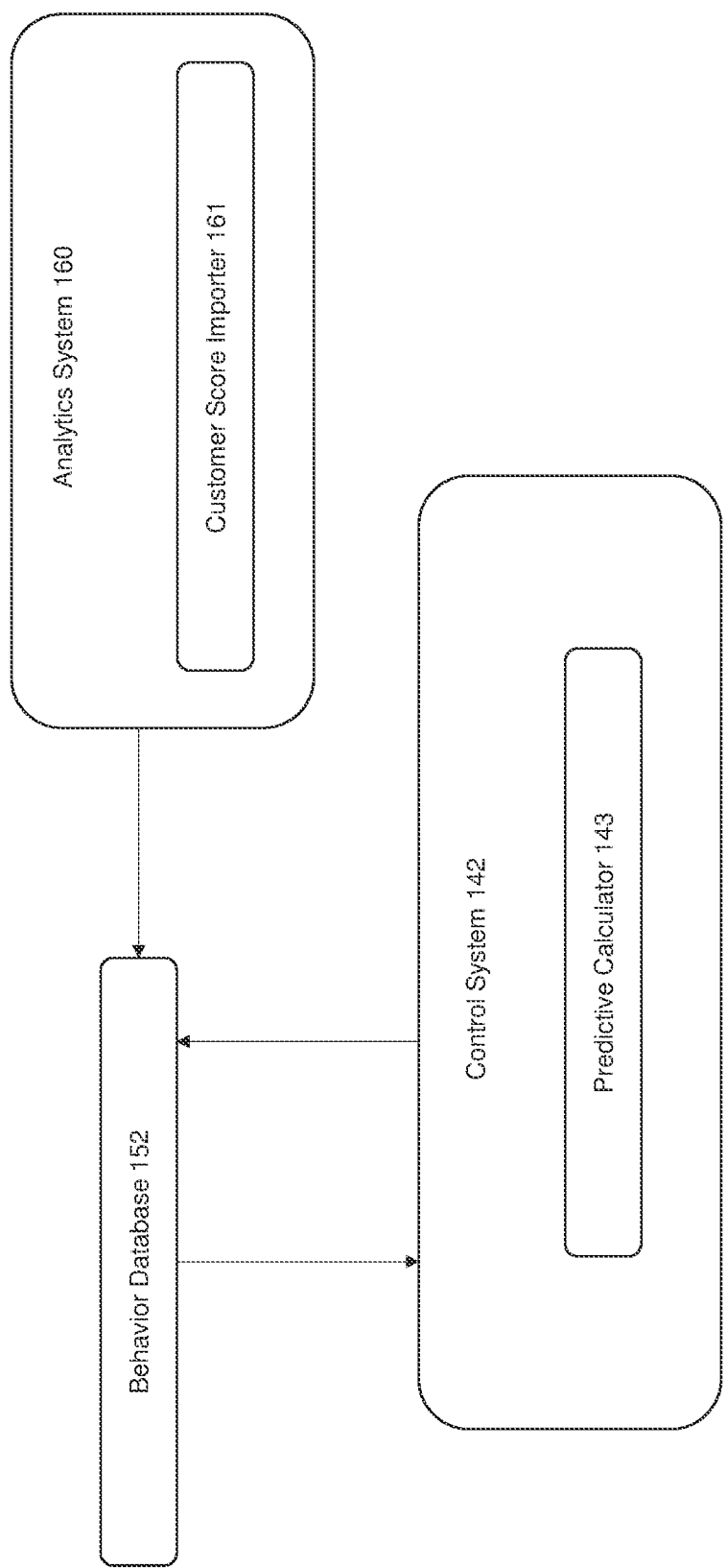
FIG. 3 is a more detailed block diagram of the components of FIG. 2 according to aspects of the present disclosure.

Referring now to FIG. 3, in several embodiments, control system 142 includes a predictive calculator 143 that performs three main functions. The predictive calculator 143: (1) coordinates the calculation of predicted interaction outcome metric values and normalizes the results; (2) executes the aggregate agent-customer pairing score function; and (3) sorts the agents based on the aggregate agent-customer pairing score, and returns the top agent(s) for routing of the communication to the top agent. In an exemplary embodiment, the predictive calculator 143 predicts customer and agent outcomes in real-time. Exemplary customer metrics predicted and optimized by the predictive calculator 143 include AHT, FCR, CSAT, RR, and sales.

In the first function, the predictive calculator 143 leverages agent performance, ACD skill, and customer data to predict interaction outcome metric values for every available agent if the interaction were routed to that agent. Each model is specific to a customer metric and the predictive calculator 143 uses each model to make a metric-specific prediction.

In the second function, the predictive calculator 143 takes the normalized predicted interaction outcome metric score available from the models and the normalized customer metric scores provided by behavior database 152, and executes the aggregate agent-customer pairing score function that results in specific values.

In the third function, after generating aggregate agent-customer pairing scores, the predictive calculator 143 sorts the agent list in either ascending or descending order based on the pairing score and passes the sorted agent list to ACD 130 to deliver the customer communication or interaction to the agent with the highest pairing score.

In various embodiments, analytics system 160 includes a customer score importer 161, which sends normalized customer scores for each customer on each customer metric to behavior database 152, which then stores the scores at the company client-ANI-agent skill level. Customer score calculations may be performed by an analytics processor or assigned by a company client. For example, an analytics processor may define the customer AHT score as the AHT for the caller's last 3 calls normalized using an established benchmark such as the mean AHT for all customers. Alternatively, the company client can provide a heuristic-based value such as CSAT=1.00 for all VIP customers and 0 for non-VIP customers to increase the importance of CSAT in the function for high-value customers and pass that to the customer score importer 161. In some embodiments, if no score is present for a customer, the predictive calculator 143 assumes a default score such as the mean across all customers.

Figure 4:
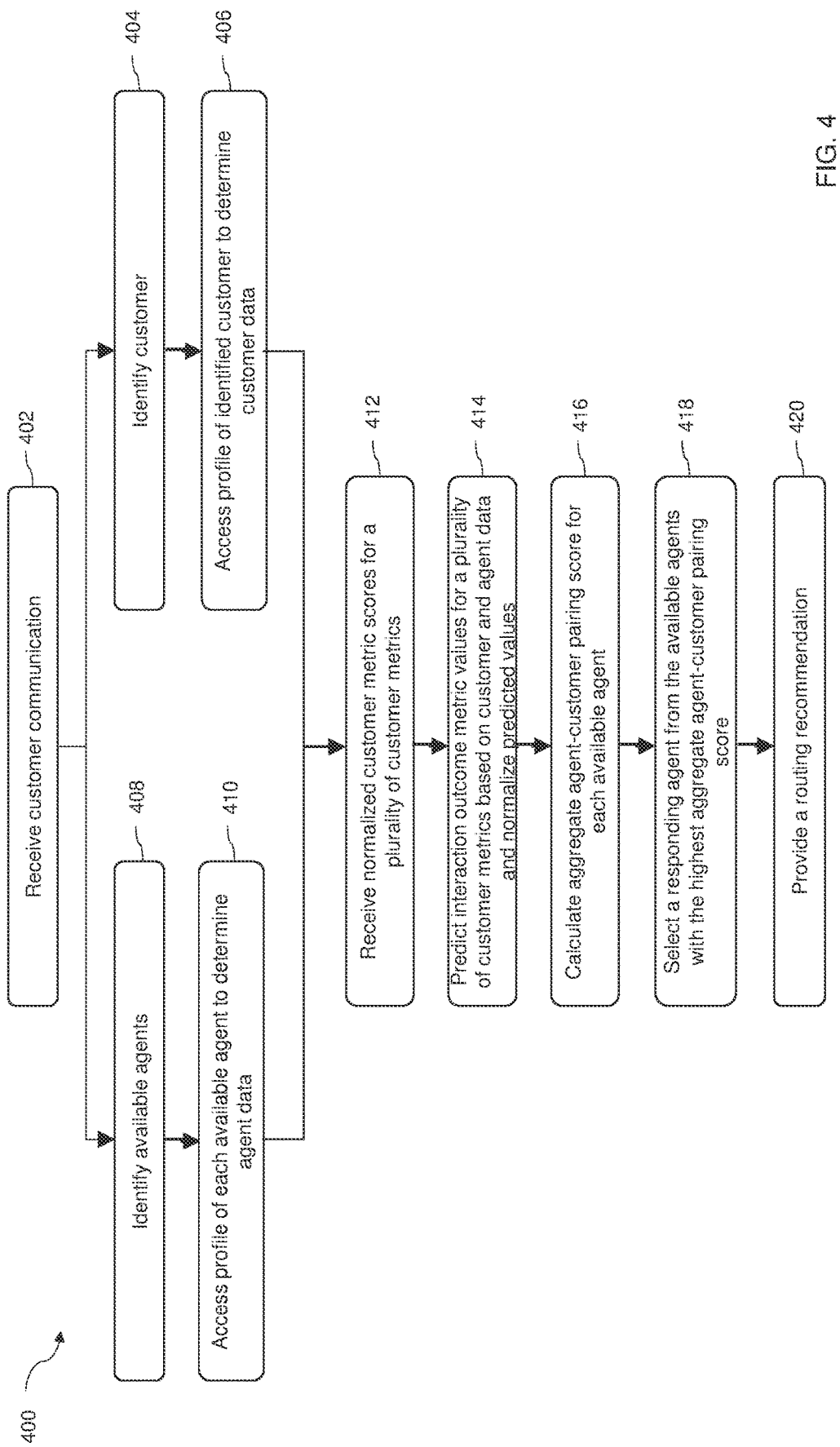
FIG. 4 is a flowchart of a method according to embodiments of the present disclosure.

Referring now to FIG. 4, a method 400 for optimizing the routing of customer communications is described. At step 402, predictive calculator 143 receives a customer communication. The communication type may include any of the channels discussed herein or available to those of ordinary skill in the art, including without limitation one or more voice calls, voice over IP, facsimiles, emails, web page submissions, internet chat sessions, wireless messages (e.g., text messages such as SMS (short messaging system) messages or paper messages), short message service (SMS), multimedia message service (MMS), or social media (e.g., Facebook identifier, Twitter identifier, etc.), IVR telephone sessions, voicemail messages (including emailed voice attachments), or any combination thereof. In one embodiment, the communication is a telephonic interaction.

At step 404, predictive calculator 143 identifies a customer associated with the customer communication. For example, a customer identifier may be used to identify the customer. It will be understood that the customer identifier may be generated by any conventional means, including but not limited to, ANI, member ID, voice portal prompted variables, IP addresses or any other suitable identifiers. In some embodiments, predictive calculator 143 receives customer communication data and uses origination data of the customer to identify a customer. Identifying origination data typically includes a contact number or network address, or any combination thereof. The contact number may include at least one of a telephone number, a text message number, SMS number, MMS number, or a combination thereof. The network address can include at least one of an email address, electronic messaging address, voice over IP address, IP address, social media identifier (e.g., Facebook identifier, Twitter identifier, chat identifier), or a combination thereof.

At step 406, once the customer is identified, predictive calculator 143 accesses a profile of the identified customer to determine customer data. For example, predictive calculator 143 may request customer data for the ANI associated with the identified customer from behavior database 152 to determine customer data including customer attributes and customer interaction history. Examples of customer attributes include personality style or type, communication patterns, preferred mode of communication, or a combination thereof. Examples of customer interaction history include interaction sentiment history, distress history, interaction outcomes, or a combination thereof. In one embodiment, behavior database 152 returns the customer data, including interaction history and communication preferences, to predictive calculator 143.

At step 408, predictive calculator 143 identifies available agents for handling the customer communication. In several embodiments, predictive calculator 143 determines the available agents by reviewing the occupancy level of agents, e.g., by obtaining agent data from the contact center 100. ACD 130 dynamically monitors occupancy level of the agents to determine availability and addresses the real-time performance metrics of the agent. This real-time (or near-real time) dynamic data is typically used to select a destination for the customer communication. Occupancy level is calculated using the following equation: Utilization time/ logged in time.

At step 410, once the available agents are identified, predictive calculator 143 accesses a profile of each available agent to determine agent data. For example, predictive calculator 143 may request agent data from behavior database 152 to determine agent performance history. Agent performance history includes one or more of: agent effectiveness (e.g., X % of customers serviced by agent have a favorable outcome for the customer and/or contact center), revenue generating proficiency (e.g., $Y generated by the agent per serviced customer), customer satisfaction level (e.g., Z % of customers serviced by agent received at least a satisfactory customer satisfaction level rating), speed (e.g., average customer service time for agent is W minutes/ contact, U % of customers are serviced within V minutes), efficiency (e.g., T % of customers serviced by agent are one-and-done), experience (e.g., number of months/years agent has serviced customers), cross-sell ability (e.g., S % of customers serviced by agent result in additional revenue due to cross-selling), personal satisfaction (e.g., the agent most prefers serving work items of skill X rather than work items of skill Y), proficiency at closing a transaction, and occupancy (e.g., select the agent who has worked less over a specified period to service a work item), or any combination thereof. Other data that can additionally or alternatively be used in the embodiment above or various alternative embodiments to determine agent performance include the transaction or task type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the customer, the rating of the customer of the agent's proficiency in handling the customer, the rating of another party, such as the agent's supervisor or another observer, or how the customer was serviced.

At step 412, predictive calculator 143 receives normalized customer metric scores for a plurality of customer metrics. In one embodiment, predictive calculator 143 receives normalized customer metric scores from behavior database 152, which in turn, receives the scores from customer score importer 161. The plurality of customer metrics can include two or more of AHT, FCR, CSTAT, RR, and sales.

At step 414, predictive calculator 143 predicts the interaction outcome metric values for a plurality of customer metrics based on the customer data and the agent data and normalizes the predicted values. The predictive models use data supplied by predictive calculator 143 to predict the outcome for each agent-customer pairing for each customer metric. In some embodiments, PBR uses mixed-effects models that combine tree-based and linear models to arrive at a predicted value for each potential customer and agent pairing. In various embodiments, predictive calculator 143 normalizes the predicted values by transforming data using a z-score or a t-score, rescaling data to have values between 0 and 1, or a combination thereof.

In several embodiments, predictive calculator 143 passes the customer data and the agent data to specific predictive models to predict interaction outcome metric values for all available agents. In some embodiments, predictive calculator 143 inputs the customer data and the agent data into a predictive model specific for each customer metric, and the predictive model outputs an interaction outcome metric score or value for each customer metric.

In exemplary embodiments, there is a predictive model for AHT that outputs a predicted AHT for the customer and each available agent, a predictive model for CSAT that outputs a predicted CSAT for the customer and each available agent, a predictive model for FCR that outputs the predicted likelihood that the communication will be resolved in the first communication for the customer and each available agent, a predictive model for RR that predicts the likelihood that the customer will stay with the company for the customer and each available agent, and a predictive model for sales that predicts how much money the communication will generate for the customer and each available agent. For example, if there were three agents available and the optimization customer metric was handle time, the predictive calculator 143 would select the handle time model and the model would output the AHT for each of the three agents.

In various embodiments, building the predictive models include collecting interaction data, customer data and agent data. Interaction data can include unstructured and structured data from a plurality of different communication channels utilized by an agent to interact with a customer. For example, interaction data may include a transcription of a previous telephone call or video chat between a customer and an agent, the text of an email exchange between the customer and agent, a written essay or other text unilaterally submitted by a customer, an applicant's enrollment application, or a pre-recorded video clip submitted by a customer. Further, structured telephony data such as call length, call origination, hold time, interaction outcome data, and similar data associated with customer interactions may also be collected. The customer data includes biographical and identification information, and the agent data collected can include training level, personality type, and other data. In some embodiments, the input data collected and/or identified may be derived from customer interactions occurring within the contact center 100 and stored in the database 152, however, in other embodiments, the data may be imported from external sources, such as one or more third-party databases operated by data collection companies.

In one embodiment, the contact center control system 142 includes predictive analytics software operable to create binary logistic regression models based on collected structured and unstructured contact center data. As part of the collection of input data, the contact center control system 142 and/or the analytics system 160 may apply behavioral algorithms to the multi-channel interaction input data. For example, a psychological behavioral model may be applied to the collected interaction data to derive personality data and other behavioral assessment information about customers and agents. Further, in certain embodiments, the customer data and the agent data may also be used as inputs into behavioral algorithms, for instance, to increase the accuracy or relevance of the behavioral profiles.

After input data, including multi-channel interaction data, customer data, and agent data, has been collected and/or identified, the input data is preferably standardized (i.e., normalized). Because the input data represents a plurality of different aspects associated with contact center operations, the input data is heterogeneous in both format and meaning. A predictive model based on heterogeneous data may produce inaccurate or unreliable prediction results. Standardization of the input data advantageously can improve predictive model performance. In that regard, the control system 142 and/or the analytics system 160 is configured to assign a dimensionless numerical value to each data value associated with the multi-channel interaction data, customer data, and agent data that indicates the data value's deviation from an average of data values associated with the same variable. In one embodiment, a standard score (or z-score) may be derived for each heterogeneous data value by first determining the mean and standard deviation of data values associated with the same variable and then determining how many standard deviations the particular data value is above or below the mean. As an example, the multi-channel interaction data may include information about the number of distress events occurring during telephone calls between customers and agents. To standardize the distress event information, the average number of distress events per call and the associated standard deviation may first be calculated. In certain embodiments, the set of data values from which the average is calculated (i.e., the benchmark data set) may be the entire pool of calls for which distress data is available; however, in alternative embodiments, the benchmark data set may be some subset of the total collected data, such distress event data for telephone calls occurring within the past year or for another matching parameter such as the type of product being discussed by the customer and contact center agent. After the mean and standard deviation for the benchmark data set is determined, each individual data value is subtracted from the mean and the difference is divided by the standard deviation to arrive at a z-score. As another example, a customer's personality type, as determined by the above-described behavioral algorithm, may be assigned a z-score. In such an example, those personality types that occur less frequently would be assigned higher z-scores. Of course, altering the benchmark data sets upon which the personality z-scores of customers are based may alter the z-scores. For instance, a benchmark data set may include all customers for which interaction data is available, may include only those customers that participated in interaction sessions in the past month, or may include any other subset of input data, or any combination thereof.

As a result of the standardization, the input data—including unstructured and structured multi-channel interaction data, customer data, and agent data—is preferably converted into a homogenous input data set and may be utilized to build a predictive model in a consistent manner. One of ordinary skill in the art will recognize based on the guidance herein that additional and/or different methods of standardizing and normalizing may be applied to the input data collected.

Next, an outcome associated with a customer interaction is identified as a target of a predictive model. In more detail, for a contact center it may be desirable to predict an actual outcome or the likelihood of some specific outcome occurring in association with a current customer interaction, be it a telephone-based interaction, web-based interaction, or other type of electronic-assisted interaction. For example, it may be useful for a company to predict a customer satisfaction score, an average handling time, or amount of sales during a customer interaction, taking into account the activities, outcomes, and experiences from prior interactions. Further examples of outcomes associated with a customer include whether a customer will terminate his or her account, whether the customer will purchase a product, whether a customer will pay an outstanding bill, whether a customer is a fraudster, and whether a customer will initiate additional subsequent interaction sessions regarding the same issue, or a combination thereof. This is a non-exhaustive list and additional and/or different outcomes related to a customer or customer interaction may be identified.

Once an outcome to be predicted is identified, a predictive model operable to predict the identified outcome or the likelihood of the identified outcome occurring is built using the input data as standardized. Specifically, in one embodiment, the standardized input data is fed into predictive analytics software that creates a binary logistic regression model based on the input data. The regression model identifies the variables within the input data that correlate to the identified outcome in the context of a customer interaction. Further, a regression coefficient may be assigned to each identified variable to establish the contribution of the variable to the predicted outcome. As an example, the model may indicate that whether a customer will cancel his or her service is correlated to the customer's personality, the number of distress events during a call, the agent's experience, and the customer's tenure, and assign a coefficient to each of the four variables. As will be discussed in detail below, data points associated with each of these four factors may be collected during a current customer interaction, aggregated at the customer level as needed, and multiplied by their respective coefficients to generate a prediction score indicative of the likelihood that a customer will cancel his or her service. One of ordinary skill in the art will recognize that the above example is simply an illustration presented for the purposes of clarity, and the identified outcome may differ, as may the number and selection of variables identified as relevant to that outcome, which may be smaller or much greater.

In certain embodiments, the contact center control system 142 and/or the analytics system 160 includes predictive analytics software executing thereon that builds the predictive model. Specifically, in one embodiment, the predictive analytics software is IBM® SPSS® Regression available from IBM®, however, in other embodiments, the predictive analytics software may be another commercially available predictive analytics product or may be a proprietary program customized for contact center prediction scenarios, or a combination thereof.

After a predictive model has identified variables relevant to the identified outcome, a benchmark data set is selected for each identified variable. Specifically, to accurately apply the predictive model to incoming customer interactions (i.e., telephone calls, etc.), data values related to the relevant variables collected during the incoming customer interactions are standardized before being fed into the model. As discussed above, benchmark data sets define the particular data against which a data value is compared for the generation of its z-score. In other words, selecting a different benchmark data set may generate a different z-score, which, in turn, may result in a different outcome prediction. Thus, selection of benchmark data sets may be utilized to customize prediction results. For example, it may be desired to determine the likelihood of a customer purchasing a product in view of customer interactions recorded in the past six months, rather than all customer interactions ever recorded. To achieve such a prediction result, the benchmark data sets selected would include data associated with customer interactions occurring in the past six months. For example, if the number of distress events per call is deemed relevant to predict an outcome, the number of distress events during a current call may be compared against a benchmark data set that only includes calls recorded in the past six months. Additionally, benchmark data sets may be based on other criteria besides time periods. In one example embodiment, a benchmark data set associated with agent tenure may be selected that includes agent tenure data for different subsets of agents, for example, agents located within a specific contact center or region of the country. Accordingly, one of ordinary skill in the art would recognize that benchmark data sets may be defined based on a plurality of factors such as time periods, geographical distinctions, biographical variables, and any number of additional factors that limit the input data upon which the above standardization process is based. Additionally, the benchmark data sets selected may be the same as or different than the benchmark data sets utilized to standardize the input data.

The predictive model may then be utilized to determine the identified outcome or the likelihood of the identified outcome occurring in association with the current interaction. This interaction may be a telephone call, video chat, instant message conversation, email exchange, or other communication session as described herein. The interaction can be real-time, near real-time (i.e., within 5 minutes, preferably within 2 minutes, and more preferably within 1 minute of capture), previously captured, or a combination thereof. In certain preferred embodiments, it is real-time.

Referring back to a previous example, if the customer's personality, the number of distress events during a call, the agent's experience, and the customer's tenure are deemed relevant to the identified outcome of a customer canceling his or her service, data values associated with each of the variables are collected from behavior database 152 and input into the predictive model to output a predicted interaction outcome metric value. The predicted interaction outcome metric value is then normalized.

At step 416, predictive calculator 143 calculates, in real-time, an aggregate agent-customer pairing score for each available agent using the normalized customer metric scores and the normalized predicted interaction outcome metric values. In several embodiments, predictive calculator 143 calculates the pairing score by applying a mathematical operator (e.g., add, subtract, multiply, or divide) to a normalized customer metric score and a normalized predicted interaction outcome metric value for each customer metric to provide a result for each customer metric. The result for each customer metric can then be combined using a mathematical operator (e.g., add, subtract, multiply, or divide) for a plurality of customer metrics to provide the aggregate agent-customer pairing score.

At step 418, predictive calculator 143 selects a responding agent from the available agents with the highest aggregate agent-customer pairing score.

At step 420, predictive calculator 143 provides a routing recommendation to ACD 130 to route the customer communication to the responding agent with the highest aggregate agent-customer pairing score.

A specific example of the method 400 will now be described in detail below. A customer communication is received from a customer, and there are three available agents to handle the communication. The predictive calculator 143 uses the predictive handling time model to output handle times for each of the three available agents. For example, the predictive handle time model may output:

Agent 1, Predicted Handle Time=80 seconds
Agent 2, Predicted Handle Time=100 seconds
Agent 3, Predicted Handle Time=120 seconds After the model generates predicted values for predicted handle time, the predicted values are normalized using the population mean across the agents in the skill (divided by 100 in this example). This procedure is repeated for the customer metrics of CSAT and sales.

The resulting normalized predicted interaction outcome metric scores or values are provided in Table 1 below.

TABLE 1

NORMALIZED PREDICTED
INTERACTION OUTCOME METRIC SCORES

| Agent | AHT | CSAT | Sales |
|---|---|---|---|
| 1 | 1.2 | 0.8 | 0.8 |
| 2 | 1.0 | 1.0 | 1.0 |
| 3 | 0.8 | 1.2 | 1.2 |

The normalized customer metric scores received from customer score importer 161 are shown in Table 2.

TABLE 2

NORMALIZED CUSTOMER METRIC SCORES

| Customer | AHT | CSAT | Sales |
|---|---|---|---|
| 1 | 1.2 | 1.0 | 0.8 |

In certain embodiments, these normalized customer metric scores are used to provide a weighting or customer emphasis on the relative importance of outcomes relative to other customers. In this example, all else being equal and relative to other customers, AHT will have a larger impact than sales in the decision of which agent to pair with this customer.

Once normalized predicted interaction outcome metric scores and normalized customer metric scores are available, predictive calculator 143 inputs the values into the aggregate agent-customer pairing score function. The function calculates an aggregate pairing score for each agent-customer pair. The aggregate score is then used to select the optimal agent-customer pairing dynamically.

Specifically, the customer and agent scores are inserted into a function for each customer metric. Each function resolves to a number. These numbers are then used in a parent function to produce a final score for each agent-customer pairing. The highest score is then selected as the desired pairing. In generic terms, where $AHTe1$ denotes the AHT normalized interaction outcome metric score for agent 1, $AHTc$ denotes the AHT normalized score for the customer, and $g(x)$ and $f(x)$ denote functions that manipulate the normalized scores using mathematical operators such as multiply and sum, they can be described generally as:

$g(f(AHTe1, AHTc), f(CSATe1, CSATc), f(SALESe1, SALESc))$
$g(f(AHTe2, AHTc), f(CSATe2, CSATc), f(SALESe2, SALESc))$
$g(f(AHTe3, AHTc), f(CSATe3, CSATc), f(SALESe3, SALESc))$

As an example, if $f(x)$ simply multiplied terms and $g(x)$ simply summed terms, the above example would result in the following:

Agent 1 with Customer 1: (1.2*1.2)+(0.8*1.0)+(0.8*0.8)=2.88
Agent 2 with Customer 1: (1.0*1.2)+(1.0*1.0)+(1.0*0.8)=3.00
Agent 3 with Customer 1: (0.8*1.2)+(1.2*1.0)+(1.2*0.8)=3.12

The operators used in the function are configured according to company client business objectives and goals (e.g. improving CSAT for certain customer types).

After predictive calculator 143 generates the aggregate agent-customer pairing scores, it sorts the agents in ascending or descending order according to their score and returns the list to ACD 130 for routing the communication to the top available agent. In this example, Agent 3 is at the top of the list:

Agent 3=3.12
Agent 2=3.00
Agent 1=2.88

Figure 5:
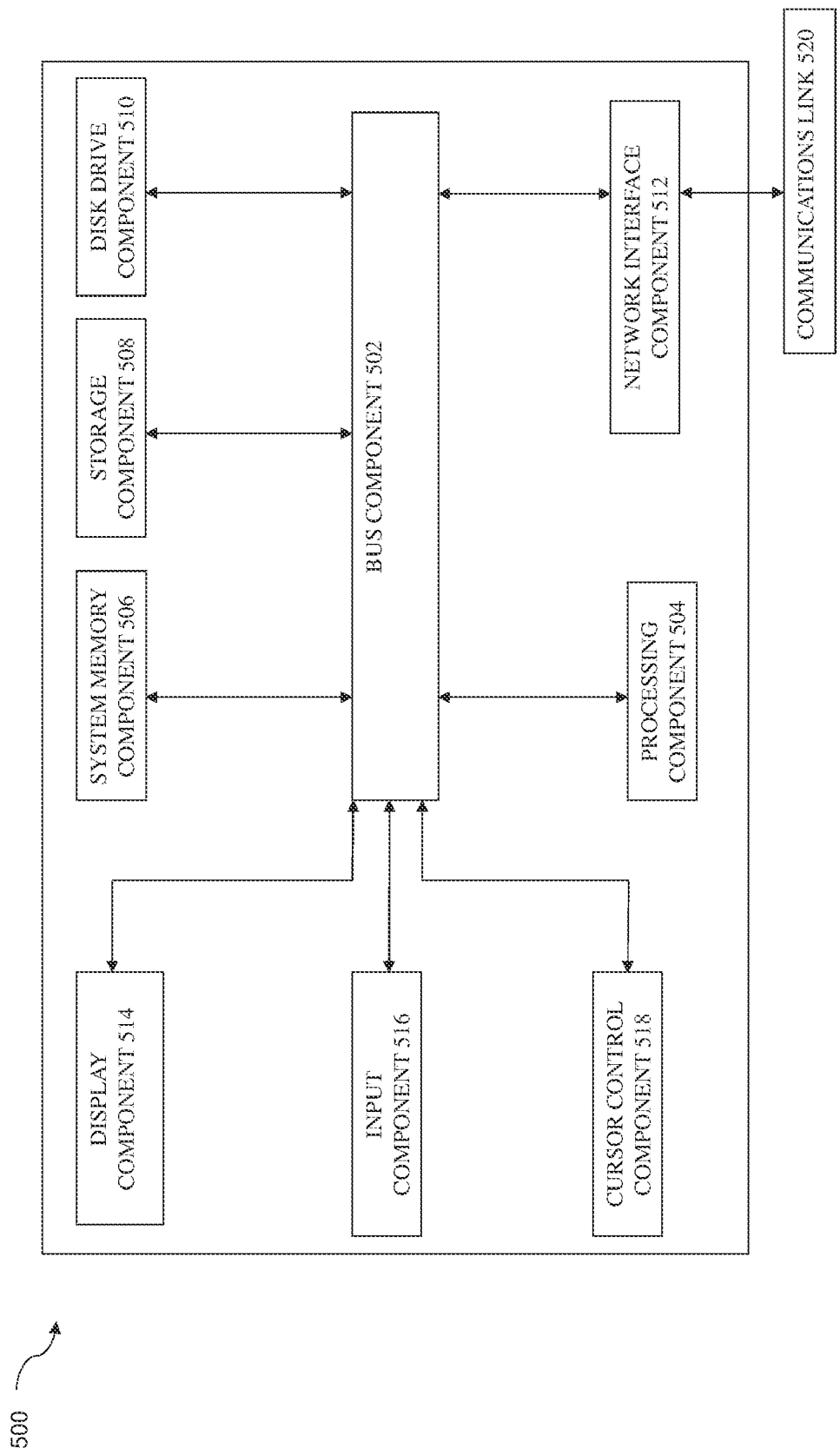
FIG. 5 is a block diagram of a computer system suitable for implementing one or more components in FIG. 1, 2, or 3 according to one embodiment of the present disclosure.

Referring now to FIG. 5, illustrated is a block diagram of a system 500 suitable for implementing embodiments of the present disclosure, including predictive calculator 143 and ACD 130. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506.

Such instructions may be read into system memory component 506 from another computer readable medium, such as static storage component 508. These may include instructions to predict interaction outcome metric values for a plurality of customer metrics based on customer data and agent data, normalize the predicted interaction outcome metric values, and calculate an aggregate agent-customer pairing score. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., networks 102 or 104 of FIG. 2, LAN 132, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system configured to optimize routing of customer communications comprising:
a processor and a computer readable medium operably coupled thereto, the computer readable medium comprising a plurality of instructions stored in association therewith that are accessible to, and executable by, the processor, to perform operations which comprise:
receiving a customer communication;
identifying a customer associated with the customer communication;
accessing a profile of the identified customer to determine customer data;
receiving customer metric scores for a plurality of customer metrics;
identifying available agents;
accessing a profile of each available agent to determine agent data;
predicting, for each available agent, interaction outcome metric values for a plurality of customer metrics based on the customer data and the agent data;
calculating, in real-time using the customer metric scores and the predicted interaction outcome metric values, an aggregate agent-customer pairing score for each available agent wherein the calculating comprises:
applying a mathematical operator to a customer metric score and a predicted interaction outcome metric value for each customer metric to provide a result for each customer metric, and
applying a mathematical operator to the result for each customer metric for a plurality of customer metrics to provide the aggregate agent-customer pairing score;
selecting a responding agent from the available agents with the highest aggregate agent-customer pairing score; and
providing a routing recommendation to a communication distributor to route the customer communication to the responding agent with the highest aggregate agent-customer pairing score.

2. The system of claim 1, wherein the plurality of customer metrics comprises two or more of handling time, first call resolution, customer satisfaction, revenue retention, or amount of sales.

3. The system of claim 1, wherein the agent data comprises agent performance history.

4. The system of claim 1, wherein the customer data comprises one or more customer attributes and customer interaction history.

5. The system of claim 1, wherein predicting the interaction outcome metric values for a plurality of customer metrics comprises inputting the customer data and the agent data into a predictive model specific for each customer metric and outputting an interaction outcome metric value for each customer metric.

6. The system of claim 5, wherein the operations further comprise building the predictive model.

7. The system of claim 6, wherein building the predictive model comprises collecting interaction data, customer data, and agent data from previous customer communications.

8. The system of claim 1, wherein the operations further comprise sorting the available agents in ascending or descending order based on the aggregate agent-customer pairing score.

9. A method for optimizing the routing of customer communications, which comprises:
receiving a customer communication;
identifying a customer associated with the customer communication;
accessing a profile of the identified customer to determine customer data;
receiving customer metric scores for a plurality of customer metrics;
identifying available agents;
accessing a profile of each available agent to determine agent data;
predicting, by a processor for each available agent, interaction outcome metric values for a plurality of customer metrics based on the customer data and the agent data;
calculating, by a processor in real-time using the customer metric scores and the predicted interaction outcome metric values, an aggregate agent-customer pairing score for each available agent, wherein the calculating comprises:

applying a mathematical operator to a customer metric score and a predicted interaction outcome metric value for each customer metric to provide a result for each customer metric, and applying a mathematical operator to the result for each customer metric for a plurality of customer metrics to provide the aggregate agent-customer pairing score;

selecting a responding agent from the available agents with the highest aggregate agent-customer pairing score; and providing a routing recommendation to a communication distributor to route the customer communication to the responding agent with the highest aggregate agent-customer pairing score.

10. The method of claim 9, wherein the plurality of customer metrics is selected from two or more of handling time, first call resolution, customer satisfaction, revenue retention, or amount of sales.

11. The method of claim 9, wherein the agent data comprises agent performance history, and the customer data comprises one or more customer attributes and customer interaction history.

12. The method of claim 9, wherein predicting the interaction outcome metric values for a plurality of customer metrics comprises inputting the customer data and the agent data into a predictive model specific for each customer metric and outputting an interaction outcome metric value for each customer metric.

13. The method of claim 12, which further comprises building the predictive model.

14. The method of claim 13, wherein building the predictive model comprises collecting interaction data, customer data, and agent data from previous customer communications.

15. The method of claim 9, which further comprises sorting the available agents in ascending or descending order based on the aggregate agent-customer pairing score.

16. A non-transitory computer-readable medium having stored thereon computer-readable instructions executable by a processor to perform operations which comprise:
receiving a customer communication;
identifying a customer associated with the customer communication;
accessing a profile of the identified customer to determine customer data;
receiving customer metric scores for a plurality of customer metrics;
identifying available agents;
accessing a profile of each available agent to determine agent data;
predicting, for each available agent, interaction outcome metric values for a plurality of customer metrics based on the customer data and the agent data;
calculating, in real-time using the customer metric scores and the predicted interaction outcome metric values, an aggregate agent-customer pairing score for each available agent wherein the calculating comprises:
applying a mathematical operator to a customer metric score and a predicted interaction outcome metric value for each customer metric to provide a result for each customer metric, and
applying a mathematical operator to the result for each customer metric for a plurality of customer metrics to provide the aggregate agent-customer pairing score;
selecting a responding agent from the available agents with the highest aggregate agent-customer pairing score; and
providing a routing recommendation to a communication distributor to route the customer communication to the responding agent with the highest aggregate agent-customer pairing score.

17. The non-transitory computer-readable medium of claim 16, wherein the plurality of customer metrics comprises two or more of handling time, first call resolution, customer satisfaction, revenue retention, or amount of sales.

18. The non-transitory computer-readable medium of claim 16, wherein the agent data comprises agent performance history, and the customer data comprises one or more customer attributes and customer interaction history.

19. The non-transitory computer-readable medium of claim 16, wherein predicting the interaction outcome metric values for a plurality of customer metrics comprises inputting the customer data and the agent data into a predictive model specific for each customer metric and outputting an interaction outcome metric value for each customer metric.

20. The non-transitory computer-readable medium of claim 16, wherein the operations further comprise sorting the available agents in ascending or descending order based on the aggregate agent-customer pairing score.

\* \* \* \* \*